Patented June 17, 1952

2,600,381

UNITED STATES PATENT OFFICE 2,600,381

BUTTER COLORING TABLET AND METHOD OF COLORING BUTTER

Leon Adler, Harry A. Reinhardt, and Elwood E. Ponath, St. Louis, Mo., assignors to Dyestuffs and Chemicals, Inc., St. Louis, Mo., a corporation of Missouri No Drawing. Application September 17, 1949, Serial No. 116,402

11 Claims. (Cl. 99—148)

This invention relates to the art of coloring butter or the like, and more especially to such art as it is practiced in the factory or creamery, as distinguished from that done on relatively small batches by the housewife at home.

At present, the most widely used coloring in the creamery industry is a vegetable oil solution containing about 3% by weight of the oil-soluble dyes sometimes called Yellow AB and Yellow OB, but most generally called FD&C Yellow No. 3 and FD&C Yellow No. 4, respectively. The cream is placed in the churn, then a measured amount of a solution of such food dyes added, and the churning is commenced. Obviously, this procedure involves a messiness in the handling of the dye solution, as there is dripping and other leakage incident to such a method, and there is likelihood of the solution becoming rancid and unfit for its intended purpose and otherwise producing a generally unsanitary condition. Also, there is ever present the real problem of finding enough storage space for the number of drums of coloring solution that must be kept on hand.

Attempts are sometimes made to avoid these aforesaid defects inherent in the use of said oil solutions of coloring. For example, said color dyes are sometimes intermixed with a base, diluent or carrier of starch, with a very small amount of vegetable oil, or the dye is mixed with rice flour with or without added sodium bicarbonate, or it is mixed with salt, etc. The use of such dry or nearly dry color powders also involves a certain messiness and waste in the measuring and weighing of the powder, and there is always danger of drafts blowing the powder around the churn-room.

In addition to the disadvantages in handling the powder just enumerated, there are also serious defects in the efficient coloration thereby. It is to be borne in mind that cream is ordinarily considered as a colloidal mass of butter fat dispersed in an aqueous medium, but it is peculiar that such cream that is sufficiently thick for churning into butter shows none of the marked properties of either the fat phase or of the water phase of the mass.

When water-soluble powdered dye is added to milk or thin cream, the dye goes into solution rapidly and reveals the solubility activity of the water phase of the liquid. However, when the same dye is added to thick cream, it will dissolve very slowly, or sometimes not at all.

When an oil-soluble dye, such as FD&C Yellow No. 3 or FD&C Yellow No. 4 is added to thin cream or milk, it will not dissolve. When it is added to thick cream it is not readily absorbed either, as there are non-compatible properties between the cream and the dye, and this causes dark spots to remain in the butter churned from the heavy cream so colored.

To overcome these difficulties and attendant deficiencies, we have developed a coloring unit that will work with maximum possible efficiency in the churning of heavy cream into butter, and by means of which there is a very complete and rapid penetration of all of the coloring matter into the butter without any dark spots remaining in the latter.

We have found that, contrary to expectations, starch or a substance composed mainly of starch, although it is insoluble in either oil or water, has such properties when compressed, that makes it ideally suitable as the vehicle or foundation diluent, base or carrier for the oil-soluble water-insoluble dye content of the butter-coloring unit. These special virtues and advantages are best secured by making the coloring medium into measured amounts or unit doses, and in compressed form, so that they may be dispersed in any predetermined number of unit increments in an aqueous medium just prior to the absorption of the dye by the butter fat of the cream in the churn.

In the carrying out of our invention, a selected starch material, such as corn starch for example, is thoroughly ground into a palpable amorphous powder, by a ball mill for about an hour, together with the selected dye substance, or other selected active substance, and for use for butter coloring for instance, we have most often used the FD&C Yellow No. 3 and the FD&C Yellow No. 4 dyes. These dyes are merely the water-insoluble example substances from the class of solid coal-tar derivatives. These dyes are used in the proportion of about 7½ pounds of each of said Yellows to about 85 pounds of the starchy material.

Any suitable and accepted manner of making into tablets may be employed, as for example by the "slugging" method wherein the ingredients are kept dry throughout, or by moistening the mixture. If the last-mentioned method is used for the granulation of the mix, then about 60 pounds of water, taken directly from the tap, is acceptable for the purpose, as it has been found that such ordinary municipally purified tap water is well adapted for such use, and this water is added to wet the amorphous starch and coloring substance. This moistened composition is then worked through about a 10-mesh screen, and dried, to obtain the properly granulated mass usually required for making into the compressed pellets or tablets. This dried granulation is then passed through a suitable tablet-making machine to turn out the compressed tablets of uniform size and weight, and we have chosen the weight of 2.70 grams per tablet. This weight is purely for simplicity of calculation, and so that said tablets will have a tintorial power equal to a standard used in the industry; one such tablet has a coloring strength equivalent to the usual one-half fluid ounce of the vegetable-oil solution that contains the FD&C Yellows No. 3 and 4 for 3% of the mix.

Unless the tablet so made is compressed sufficiently, it is little or no better than if its ingredients had remained in loose powder form, and it takes but a few simple comparative tests to reveal that if such a tablet is sufficiently compressed, as will be shown hereinafter, we obtain new and valuable properties and virtues that make it an ideal form for the butter-coloring use.

These properties and actions are easiest illustrated by the examples that follow, the composition going to make up the tablets being exactly the same in each instance, and the dyes used being the FD&C Yellows Nos. 3 and 4 for 15% of the mix, and using 85% of corn starch:

*1st test.*—Apply a few drops of water to the coloring composition that is in loose powder form; whereupon it will be noticed that the water does not penetrate the mass, but instead, tends to run off or roll away.

*2nd test.*—Apply a few drops of water to a lightly compressed tablet, that is, one wherein the density of the tablet is less than about one gram per cubic centimeter; whereupon it is found that this water remains on top of the tablet for hours with practically no penetration. As a matter of fact, it is only with much difficulty that said mass may be made into a paste by strong mechanical mixing of the same. Seemingly, the water-insoluble dyes of the tablet composition shields the starch from the water, so that the latter is not absorbed into the starch.

*3rd test.*—Apply a few drops of water to a tablet that has been compressed to a density of about at least one gram per cubic centimeter, and most remarkable results follow. The tablet absorbs the water almost instantly, then expands and bursts, thus causing fine dispersion of the tablet material into the water, all finely divided and flocculent.

A tablet thus "exploded" as last-described, and with some added water, may then be mixed with the cream to be churned and will color the butter uniformly and with no dark spots in the butter, and will perform such coloration extremely rapidly and evenly. The properly compressed tablet absorbs the water almost at once and the mass swells and puffs and falls apart to make a mass which shows thixotropic properties.

Similar results are obtained for such tablets, when starches other than corn starch are used, as for example potato starch, rice starch, wheat starch, etc. Likewise, analogous results are obtained if other starchy substances such as flours from rice, potatoes, wheat, corn, etc., are used, but these flours are not as good for the purpose as the true starches, because wheat flour for instance, contains gluten which binds the tablet together more strongly than is desirable, and the potato flour has a binding material which becomes slimy.

Other diluents can be used with the starch as part of the base, as for example sodium bicarbonate, but increasingly satisfactory results are obtained as the starch content of the diluent approaches 100%. For example, a composition of 15% of the combined FD&C Yellows Nos. 3 and 4, 70% sodium bicarbonate, and 15% starch, compressed properly into tablets, will cause dark spots to remain in the butter, and which is an indication that the starch in the tablet needs to be present in a sufficient amount to aid in the final dispersion of the oil-soluble, water-insoluble dye in the cream during churning. Keeping the FD&C Yellows at 15% while varying the starch content from 15% upwardly to 85% and while changing the sodium bicarbonate content from 70% down to 0% disclosed that although commercially possible results were obtained when the starch content was about 40% while the sodium bicarbonate content was about 45%, increasingly satisfactory results were obtained as the foundation substance more nearly approached 100% starch.

When using a water-insoluble active ingredient such as the FD&C Yellows No. 3 and No. 4, we have found that the same should not be present in the formulation in an amount more than about 25%. When using an active ingredient that is water-soluble to a greater or less degree, such ingredient should be present in an amount from about 5% to 25%, depending upon its water-solubility, the amount decreasing with increasing water-solubility.

In the making of the creamery butter, and with our novel coloring tablets, the pasteurized cream is run into the churn and its weight noted, from which the actual butter-fat weight in the churn is computed. Assuming that there is such a weight of butter-fat in the churn that would ordinarily require 11 fluid ounces of the customary 3% vegetable-oil solution of the FD&C Yellows Nos. 3 and 4 for the desired degree of coloration, then our tablets would be substituted for the latter in the amount of one such tablet for each one-half ounce of the solution. Thus, it would require twice 11, or 22 of such tablets. This computed number of tablets would then be counted out, preferably into a small receptacle, say a quart-sized glass jar, and about 22 fluid ounces of water at room temperature taken from the tap and run into the jar. The tablets disintegrate in a matter of seconds, whereupon the thixotropic mass in the jar is stirred or shaken, and then emptied into the churn. Any particles left clinging to the jar are washed out and emptied into the churn. The butter is then churned in the usual manner.

The reason that the dispersion water is added to the tablets at room temperature is that when such water is over 100° F. temperature, or so, it gelatinizes the starch and prevents the disintegrating action of the tablets for the proper results.

The tablets thus made are extremely easy to use, save time in handling, will keep in good condition indefinitely in a dry place, are used without the possibility of drippage, leakage or other messiness or insanitation incident to the use of powders and liquids, occupy a bare minimum of storage space, are safely and readily shipped, and insure the utmost accuracy in securing the predetermined degree of coloration of the butter.

Having thus described our invention, it is obvious that various immaterial modifications may be made in the same without departing from the spirit of our invention; hence we do not wish to be understood as limiting ourselves to the exact form, composition, amounts and uses herein disclosed, except as limited by the state of the art to which this invention appertains, or by the claims hereunto appended.

What we claim is:

1. A tablet comprised of a starchy substance compressed to a density of more than one gram per cubic centimeter, and a water-insoluble dye, said tablet being thixotropically dispersible in an aqueous medium.

2. A tablet adapted to become thixotropic in water for use with cream for churning and comprising a starch compressed to a density of about at least one gram per cubic centimeter, and with up to 25% of a water-insoluble coloring substance.

3. A tablet for coloring oleaginous material and comprising a minor proportion of water-insoluble and oil-soluble coloring substance and a major proportion of starch substance, all compressed to a density of about at least one gram per cubic centimeter.

4. A tablet for coloring an oleaginous material and comprising a minor proportion of FD&C Yellow No. 3 and FD&C Yellow No. 4, and a major proportion of a starchy substance, said tablet compressed to a density of about at least one gram per cubic centimeter.

5. The method of treating churnable cream, which consists in pre-dispersing starch-containing oil-soluble and water-insoluble coloring material which has been compressed to at least one gram per cubic centimeter density, in an aqueous medium, and then adding the same to the cream and churning.

6. The method of churning cream into butter, which consists of intermixing an oil-soluble dye in a starch carrier compressed to at least one gram per cubic centimeter to make a tablet, dispersing said tablet in water to become thixotropic, adding said thus-dispersed tablet to said cream and churning.

7. The method of churning an oleaginous substance which consists of pre-dispersing a color-carrying starch tablet that has been compressed to at least one gram per cubic centimeter in water, then absorbing said thus-dispersed liquid into the oleaginous substance by churning.

8. A tablet dispersible in an aqueous medium, comprising a starchy substance and a water-insoluble solid coal-tar derivative, said tablet being compressed to a density of at least one gram per cubic centimeter.

9. A tablet comprised of a starchy substance compressed to a density of at least one gram per cubic centimeter, and an oil soluble coloring.

10. The method of dispersing the ingredients of a tablet of starchy material that contains a water-insoluble solid coal-tar derivative material, into an aqueous medium, which consists in compressing said tablet to at least one gram per cubic centimeter, and mixing the compressed tablet into said aqueous medium.

11. The method of dispersing an oil-soluble ingredient containing tablet in an aqueous medium, which consists in forming said tablet of a major proportion of starchy matter with a minor proportion of oil-soluble ingredient, compressing the resultant mass into a tablet to at least one gram per cubic centimeter, and intermixing said compressed tablet in said aqueous medium.

LEON ADLER.
HARRY A. REINHARDT.
ELWOOD E. PONATH.

REFERENCES CITED

The following references are of record in the file of this patent:

UNITED STATES PATENTS

| Number | Name | Date |
| --- | --- | --- |
| 1,507,820 | Files | Sept. 9, 1924 |
| 1,649,821 | Files | Nov. 22, 1927 |
| 1,783,154 | Schaub | Nov. 25, 1930 |
| 2,052,175 | Haurand | Aug. 25, 1936 |
| 2,454,420 | Adler et al. | Nov. 23, 1948 |